United States Patent [19]

Adkins et al.

[11] Patent Number: 5,510,535
[45] Date of Patent: Apr. 23, 1996

[54] ETHER-LINKED AMINE-TERMINATED POLYETHERS AND A PROCESS FOR THEIR PRODUCTION

[75] Inventors: Rick L. Adkins, New Martinsville; William E. Slack, Moundsville, both of W. Va.

[73] Assignee: Bayer Corporation, Pittsburgh, Pa.

[21] Appl. No.: 343,295

[22] Filed: Nov. 22, 1994

[51] Int. Cl.$^6$ .................................................. C07C 209/08
[52] U.S. Cl. ........................... 564/474; 564/399; 528/210; 528/373; 528/422
[58] Field of Search ...................................... 564/399, 416, 564/479, 501, 482; 568/619, 609; 528/210

[56] References Cited

U.S. PATENT DOCUMENTS

| | | | |
|---|---|---|---|
| 3,654,370 | 4/1972 | Yeakey | 260/584 B |
| 3,666,726 | 5/1972 | Grogler et al. | 260/77.5 CH |
| 3,691,112 | 9/1972 | Grogler et al. | 260/2.5 AM |
| 3,808,250 | 4/1974 | Blahak et al. | 260/445 R |
| 4,036,882 | 7/1977 | Bertozzi et al. | 260/584 B |
| 4,129,741 | 12/1978 | Schmidt et al. | 560/50 |
| 4,153,801 | 5/1979 | Schmidt et al. | 548/312 |
| 4,247,677 | 1/1981 | Schmidt et al. | 548/68 |
| 4,847,416 | 7/1989 | Durvasula et al. | 564/443 |
| 4,902,768 | 2/1990 | Gerkin et al. | 528/68 |
| 5,015,774 | 5/1991 | Suekane et al. | 564/475 |
| 5,043,472 | 8/1991 | Mafoti | 560/358 |
| 5,326,829 | 7/1994 | Slack et al. | 525/403 |

OTHER PUBLICATIONS

CAS Registry Handbook Number Section, 1965–1971 Published by Chemical Abstracts Service (1974) Reg. No. 6268-12-8.
Morrison et al., *Organic Chemistry* (32 Ed) Published by Allyn and Bacon, Inc. (1977) p. 555.
JACS 109 (1987) pp. 3353–3354.

*Primary Examiner*—Brian M. Burn
*Attorney, Agent, or Firm*—Joseph C. Gil; Lyndanne M. Whalen

[57] ABSTRACT

Ether-linked amine-terminated polyethers are produced by reacting (1) a polyether polyol in which substantially all of the hydroxyl groups have been replaced with good leaving groups with (2) an aminoalcohol and/or aminothiol and (3) a deprotonating agent. The aminopolyethers obtained by this process are characterized by low viscosities and excellent reactivities over a wide range of molecular weights and functionalities.

11 Claims, No Drawings

ETHER-LINKED AMINE-TERMINATED POLYETHERS AND A PROCESS FOR THEIR PRODUCTION

BACKGROUND OF THE INVENTION

The present invention relates to a process for the production of ether-linked amine-terminated polyethers and to the polyethers obtained by this process.

Amine terminated polyethers and processes for their production are known. See, for example, U.S. Pat. Nos. 3,808,250; 4,129,741; 4,153,801; 4,247,677; and 4,847,416. In each of these patents, amine terminated polyethers are produced by reacting a polyether polyol with isatoic acid anhydride or a halogen substituted nitrobenzene in the presence of a strong base. These disclosed processes are limited to aromatic amine terminated polyethers.

U.S. Pat. No. 3,654,370 discloses amine-terminated polyethers which are prepared by reacting polyols with ammonia in the presence of a catalyst at high temperature. The required catalyst is prepared by reducing a mixture of oxides of nickel, copper and chromium.

U.S. Pat. Nos. 3,666,726 and 3,691,112 disclose polymers which are produced using a polyfunctional aminocrotonic acid ester represented by a specified formula. This aminocrotonic acid ester may be prepared from amine-based polyethers. These amine-based polyether polyols are prepared by reacting an alkylene oxide with monoamines or polyamines containing aliphatic or secondary amino groups.

U.S. Pat. No. 5,043,472 discloses storage-stable solid isocyanate compositions which are taught to be useful in polyisocyanate addition reactions. The isocyanate-reactive materials which may be used as reactants for these isocyanates include amine-terminated polyethers. Disclosures teaching methods for the production of such amine-terminated polyethers are identified.

U.S. Pat. No. 4,902,768 discloses elastomers prepared from N-(polyoxyalkyl)-N-(alkyl)amines. These amines are prepared by reacting an alcohol with a primary amine and/or secondary amine in the presence of a catalyst such as nickel.

U.S. Pat. No. 5,015,774 discloses a process for the production of polyoxyalkylene polyamines having terminal secondary amino groups in which a polyoxyalkylene polyol is reacted with a primary amine in the presence of a monohydric alcohol and a catalyst selected from a specified group of catalysts.

U.S. Pat. No. 5,326,829 discloses a method for preparing an activated polyether polyol in which an aminoalcohol having from 1 to 18 carbon atoms in the alkyl or aryl group is reacted with a polyether having a good leaving group such as a halide, a sulfonate or a nitrophenoxy group at a temperature of from 50° to 250° C.

Co-pending patent application Ser. No. 07/957,929 filed Oct. 7, 1992 discloses a process for the production of secondary amine terminated polyethers in which a polyether containing from 2 to 6 leaving groups is reacted with a primary amine or ammonia at a temperature of from about 70° to about 250° C. The polyethers obtained have an amine functionality of from 2 to 6.

SUMMARY OF THE INVENTION

It is an object of the present invention to provide a new method for producing ether-linked amine-terminated polyethers.

It is another object of the present invention to provide a method for producing ether-linked amine-terminated polyethers in which relatively mild reaction conditions are required.

It is a further object of the present invention to provide a process for producing ether-linked aliphatic or aromatic amine-terminated polyethers.

It is also an object of the present invention to provide a process for producing ether-linked, aromatic amine-terminated polyethers in which the terminal amino group(s) may be located at the position which is ortho, meta or para to the ether linkage.

It is another object of the present invention to provide ether-linked amine-terminated polyethers characterized by low viscosity and excellent reactivity over a wide molecular weight and functionality range.

These and other objects which will be apparent to those skilled in the art are accomplished by reacting a polyether polyol in which substantially all of the hydroxyl groups have been converted to leaving groups with an aminoalcohol and/or aminothiol and a compound which is capable of deprotonating the hydroxy group of the aminoalcohol or aminothiol.

DETAILED DESCRIPTION OF THE PRESENT INVENTION

The present invention relates to a process for the production of ether-linked amine-terminated polyethers. In this process, a polyether polyol in which substantially all (i.e., at least 75%) of the hydroxyl groups have been replaced with good leaving groups is reacted with an aminoalcohol and/or an aminothiol and a material which is capable of deprotonating the hydroxy group of the aminoalcohol and/or aminothiol. The process of the present invention is generally carried out at temperatures of up to about 200° C. The amine-terminated polyethers produced by the process of the present invention are obtained in high yield and include aliphatic and aromatic amine-terminated polyethers. A unique characteristic of the claimed process is its ability to produce aromatic amine-terminated polyethers which are meta-substituted with respect to the amine group. These amines are also produced in high yields.

The amine-terminated polyethers produced in accordance with the present invention preferably have a functionality of from about 1 to about 6 and a molecular weight of at least 100, preferably from about 106 to about 6,000 and most preferably from about 400 to about 5000. These amine-terminated polyethers have relatively low viscosities, i.e., viscosities of less than 10,000 mPa.s, preferably from about 50 to about 5000 mPa.s. The equivalent weight of these amine-terminated polyethers typically ranges from about 100 to about 3000, preferably from about 200 to about 2500.

The polyether containing good leaving groups which is used as a starting material in the practice of the present invention may be prepared from any of the known polyether polyols. Such polyether polyols may, for example, be obtained by the polymerization of alkylene oxides or by the addition of one or more alkylene oxides to a starter material containing reactive hydrogen atoms. Examples of the alkylene oxides which are typically used to produce polyether polyols include: ethylene oxide, propylene oxide, butylene oxide, tetrahydrofuran, styrene oxide, epichlorohydrin and combinations thereof. Examples of typical starter materials include: water; alcohols such as ethylene glycol, 1,3-propylene glycol, 1,2-propylene glycol, trimethylol propane and 4,4'-dihydroxydiphenyl propane; amines such as aniline, ammonia, ethanolamine, ethylene diamine and mixtures thereof; and polytetrahydrofuran.

Preferred polyether polyols include those having functionalities of from 1 to 6, most preferably from 2 to 4, and molecular weights of from about 100 to about 6,000.

Substantially all of the hydroxyl groups of the polyether polyol must be replaced with good leaving groups prior to being used in the practice of the present invention. As used herein, the term "good leaving group" means a group which may be displaced at the carbon atom by a nucleophile (e.g., nitrogen, oxygen, sulfur) or an anion of a nucleophile. The rate of displacement by the nucleophile or anion of the nucleophile will, of course, depend upon the chemical nature of the group being displaced. The more stable the group being displaced is as a separate entity, the easier it is to displace that group. For example, iodide is a better leaving group than fluoride because the iodide moiety is more stable than the fluoride moiety.

Many groups which function as good leaving groups in chemical processes are known to those skilled in the art. Any of these known leaving groups may be used in the practice of the present invention. Examples of leaving groups which are preferred in the process of the present invention include: sulfonates (particularly methyl sulfonates), nitrophenoxides, halides such as chlorides, bromides, and iodides.

Methods for replacing the hydroxyl groups of the polyether polyol with good leaving groups are known to those skilled in the art. In one method which is effective for making such substitution, the polyether polyol is reacted with a halogenation reagent such as carbonyl chloride, thionyl chloride, alkylsulfonylchloride, sodium iodide in trimethylchlorosilane, methanesulfonyl chloride in dimethyl formamide or triphenyl phosphine in carbon tetrachloride. Where a carbonyl chloride is used, the reaction is generally carried out at a temperature of from about 0° to about 40° C. for a period of from about 2 to 8 hours. The resultant chloroformate may then be rearranged at an elevated temperature (e.g., from 75° to 150° C., preferably from about 100° to about 120° C.) or in the presence of a catalyst such as a tertiary amine or amide) to form a polyether alkyl chloride. It is also possible to form the polyether chloride directly by adding carbonyl chloride to a solution of the polyether polyol in N,N-dimethylformamide.

Polyether sulfonates may be prepared by reacting the polyether polyol with methanesulfonyl chloride, optionally in the presence of a tertiary amine or amide. This reaction may be carried out at temperatures ranging from about −30° to about 40° C.

Aminoalcohols and aminothiols useful in the practice of the present invention include those represented by one of the following formulae

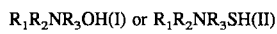

in which

R$_1$ represents hydrogen,

R$_2$ represents hydrogen, an alkyl, alkenyl, cycloalkyl, aralkyl, or aryl radical, and R$_3$ represents an alkyl, alkenyl, cycloalkyl, aralkyl, aryl, or polyaryl radical.

Such aminoalcohols and aminothiols include: N-aliphatic aminoalcohols, N-aromatic aminoalcohols, aminophenols, substituted aminophenols, aminothiols and aminothiophenols.

The material capable of deprotonating the alcohol group of the aminoalcohol used in the practice of the present invention may be represented by one of the following formulae

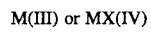

in which

M represents an alkali metal, such as Li, Na, or K and

X represents hydrogen, a hydroxide group, an alkoxide group, CO$_3$, or R$^-$ (where R$^-$ contains a carbon anion).

Specific examples of suitable deprotonating materials include: sodium, sodium hydroxide, sodium hydride, potassium hydroxide, potassium carbonate, methyl lithium, or potassium tert-butoxide.

In a preferred embodiment of the invention, the aminoalcohol and/or aminothiol and deprotonating agent are pre-reacted before being reacted with the polyether polyol containing good leaving groups. It is particularly preferred that the aminoalcohol and/or aminothiol be pre-reacted with the deprotonating agent to form, for example, an aminoalkoxide, when the aminoalcohol or aminothiol is an aliphatic aminoalcohol (i.e., no aromatic ring is present in R$_1$, R$_2$ or R$_3$). This pre-reaction product is then reacted with the polyether polyol containing leaving groups. This pre-reaction may be carried out at a temperature of from about 0° to about 120° C., preferably from about 0° to about 40° C.

When the aminoalcohol and/or aminothiol and deprotonating agent are pre-reacted, they are generally reacted in substantially stoichiometric amounts, although it would be possible to react them in amounts of from 1.01 mol deprotonating agent per OH equivalent to 5 mol deprotonating agent per OH equivalent.

The reactants used in the process of the present invention are generally reacted in amounts such that the molar ratio of polyether polyol with leaving groups to aminoalcohol and/or aminothiol to deprotonating agent is at least 1:1:1, preferably 1:1.02:1.02.

Where the aminoalcohol and/or aminothiol and deprotonating agent are pre-reacted, the ratio of polyether polyol with leaving groups to pre-reaction product is generally at least 1:1, preferably from 1:1.02 to 1:1.5.

The process of the present invention, pre-reaction of the aminoalcohol and/or aminothiol with deprotonating agent and the replacement of the polyether polyol hydroxy groups with good leaving groups may each be carried out in the presence of a suitable solvent. Examples of suitable solvents include: methylene chloride, toluene, chlorobenzene, dimethyl-sulfoxide, tetrahydrofuran. Such solvents are not, however, necessary to the practice of the present invention.

The amine-terminated polyethers produced by the process of the present invention may be recovered in high yield and purity by any of the techniques known to those skilled in the art. Suitable techniques include filtration and stripping by means of a wiped thin film evaporator.

Having thus described our invention, the following Examples are given as being illustrative thereof. All parts and percentages given in these Examples are parts by weight and percentages by weight, unless otherwise indicated.

EXAMPLES

The materials used in the following Examples were as follows:

POLYOL A: A glycerine/propylene oxide/ethylene oxide polyether polyol having a molecular weight of 4800 and a functionality of 3 in which the ethylene oxide was present as 17 wt %.

MESYLATE A (Polyol With Good Leaving Groups):

Mesylate prepared by combining 0.312 equivalents of POLYOL A with 0.35 mol of triethylamine and 60 ml of methylene chloride in a 3 necked flask fitted with a stirrer and a reflux condenser (under nitrogen). 0.35 mol of methane sulfonyl chloride were added dropwise to the flask. The temperature of the flask was maintained at 25° C. during this addition. The solution was stirred at 25° C. for an additional 30 minutes after the addition was complete and then neutralized with 0.35 mol of sodium hydroxide. Triethylamine, solvent, and water were removed by vacuum stripping. The resulting mixture was filtered to give a clear, almost colorless liquid product. The product had an equivalent weight of about 1680.

EXAMPLE 1

0.182 mol of 2-aminophenol were added to a 3-necked flask containing 100 ml of dimethylsulfoxide (DMSO) (under nitrogen). 0.178 equivalents of MESYLATE A were added to the flask and the contents of the flask were stirred until a homogeneous mixture was obtained. 0.182 equivalents of a 50% sodium hydroxide solution were added to the flask and the contents of the flask were then heated at 50° C. for 3 hours. A water/DMSO mixture was removed by heating the contents of the flask to 150° C. under a vacuum. The remaining solution was filtered and run through a wiped thin film evaporator under vacuum as a final stripping step. A dark, red liquid having a viscosity of 2450 mPa.s (at 25° C.) and an amine number of 31.1 was obtained. The degree of conversion was 94% of theoretical (based on amine number).

EXAMPLES 2–5

The procedure of Example 1 was repeated with the exception that the amine indicated in Table 1 was used instead of 2-aminophenol. The molar and equivalent ratios in each of these Examples 2–5 were the same as those used in Example 1.

The results of these Examples are reported in Table 1.

TABLE 1

| | Examples | | | |
|---|---|---|---|---|
| Amine | 2<br>3-amino-<br>phenol | 3<br>4-amino-<br>phenol | 4<br>4-amino-3-<br>methyl-<br>phenol | 5<br>4-amino-<br>thio-phenol |
| Temp. (°C.) | 50 | 50 | 50 | 50 |
| Time (hr.) | 3.0 | 3.0 | 3.0 | 3.0 |
| Amine No. | 31.9 | 32.1 | 29.5 | 28.5 |
| % Conversion[1] | 96.3 | 96.9 | 89.8 | 86.9 |
| Viscosity (mPa · s)[2] | 2590 | 2240 | 2130 | 925 |

[1]Based on NH number.
[2]At 25° C.

EXAMPLE 6

0.107 mol of 2-(ethylamino)ethanol, 50 ml of DMSO and 0.107 mol of a 50% sodium hydroxide solution were added to a three-necked flask-equipped with a Dean Stark trap (under nitrogen). 150 ml of toluene were added to the flask and the contents of the flask were heated at reflux for 1.5 hours to remove the water formed in the reaction. Toluene was removed from the reaction mixture by distillation. The remaining solution was cooled. 0.089 equivalents of MESYLATE A were added to the flask. The contents of the flask were then heated at 75° C. for 1.5 hours. Residual solvent was removed by heating the contents of the flask to 150° C. under a vacuum. The remaining contents of the flask were filtered and a light yellow liquid with a viscosity of 1130 mPa.s (at 25° C.) and an amine number of 24.8 was recovered. The conversion was 74% of theoretical (based on amine number).

EXAMPLE 7

0.117 mol of sodium hydride were added to a three-necked flask containing 50 ml of dry tetrahydrofuran (THF) (under nitrogen). 0.107 equivalents of 2-(ethylamino)-ethanol were slowly added to the flask. The temperature of the solution in the flask was maintained below 27° C. during the addition. The contents of the flask were then heated at 50° C. for 30 minutes. After cooling, MESYLATE A was slowly added. The contents of the flask were then heated at 50° C. for 1.6 hours. 2 ml of water were then added to quench any excess sodium hydride. A vacuum was applied to the flask and the solution was heated to 150° C. to strip any solvent. The remaining solution was filtered and a light yellow liquid having a viscosity of 1090 mPa.s (at 25° C.) and an amine number of 25.7 was recovered. The conversion was 77% of theoretical (based on amine number).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an ether-linked amine terminated polyether comprising reacting
   1) a polyether polyol in which substantially all hydroxyl groups have been converted to a leaving group with
   2) an aminoalcohol and/or aminothiol and
   3) a material which is capable of deprotonating 2).

2. The process of claim 1 in which aminoalcohol and/or aminothiol 2) and deprotonating agent 3) are reacted prior to reaction with polyether polyol 1).

3. The process of claim 1 in which the hydroxyl groups of polyether polyol 1) have been converted to a leaving group selected from the group consisting of chloride, bromide, iodide, sulfonate and mesylate groups.

4. The process of claim 1 in which the aminoalcohol and/or aminothiol is selected from the group consisting of N-aliphatic aminoalcohols, N-aromatic aminoalcohols, aminophenols, substituted aminophenols, diaminophenols, N-aliphatic aminothiols, N-aromatic aminothiols and aminothiophenols.

5. The process of claim 1 in which deprotonating agent 3) is selected from the group consisting of sodium, sodium hydroxide, sodium hydride, and potassium hydroxide.

6. The process of claim 1 in which the polyether polyol 1) has a functionality of from 1 to 6 and a molecular weight of from 100 to 6000.

7. The process of claim 1 in which the reaction is carried out at a temperature of from about 50° to about 200° C.

8. The process of claim 1 in which a solvent is present in the reaction mixture.

9. The process of claim 1 in which
   a) polyether polyol 1) is blocked with halide leaving groups and b) an N-aliphatic aminoalcohol is reacted with sodium hydroxide to form an aminoalkoxide prior to reaction with the polyether polyol 1).

10. The process of claim 1 in which
a) polyether polyol 1) is blocked with mesylate leaving groups,
b) an aminophenol is used as aminoalcohol 2) and
c) sodium hydroxide is used as deprotonating agent 3).

11. The process of claim 1 in which
a) polyether polyol 1) is blocked with mesylate leaving groups,
b) an N-aliphatic aminoalcohol is used as aminoalcohol 2) and
c) sodium hydride is used as deprotonating agent 3).

* * * * *